United States Patent [19]

Chuang

[11] Patent Number: 5,190,668

[45] Date of Patent: Mar. 2, 1993

[54] METHOD FOR THE REMOVAL OF VOLATILE ORGANIC COMPOUNDS FROM WATER

[76] Inventor: Karl T. Chuang, 14717 - 45 Ave., Edmonton, Alberta, Canada, T6H 5R4

[21] Appl. No.: 767,818

[22] Filed: Sep. 30, 1991

[51] Int. Cl.⁵ .............................................. C02F 1/72
[52] U.S. Cl. .................................. 210/750; 210/763; 210/766
[58] Field of Search ............... 210/807, 750, 747, 763, 210/766, 181, 170, 188

[56] References Cited

U.S. PATENT DOCUMENTS 4,892,664  1/1990  Miller ............................. 210/750 X Primary Examiner—Frank Spear
Attorney, Agent, or Firm—Francis W. Lemon; J. Wayne Anderson

[57] ABSTRACT

A process for removing volatile organic compounds such as methanol from wastewater comprising first stripping the organic compound from water and then oxidizing the organic compound in the gaseous phase using a hydrophobic catalyst, to form harmless reaction products.

17 Claims, 7 Drawing Sheets

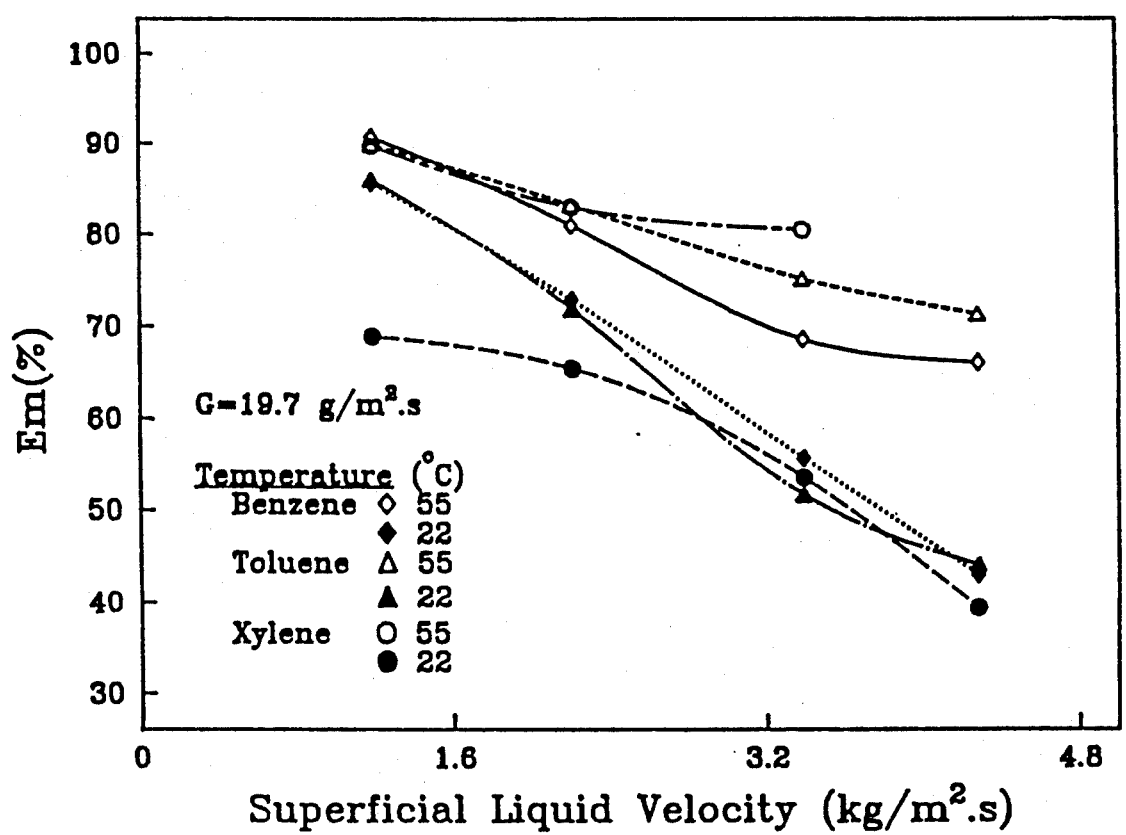
FIG. II

METHOD FOR THE REMOVAL OF VOLATILE ORGANIC COMPOUNDS FROM WATER

BACKGROUND OF THE INVENTION

1. Field of the Invention

This invention relates to the removal of volatile organic contaminants from water, and in particular to the stripping/desorption from water and catalytic oxidation of such volatile organics in the gaseous phase.

Wastewater effluent from chemical or petrochemical plants often contains volatile organic compounds (VOCs). Many of the VOCs are known to be toxic and hazardous. To meet increasingly tougher environmental standards, the wastewater must be treated to remove the pollutants before being discharged.

2. Description of the Prior Art

Currently, carbon adsorption and air stripping are the most commonly used VOC removal techniques. The treatment consists of two steps: 1) removal of VOCs from the wastewater by air stripping and 2) destruction of VOCs contained in the resulting air stream by catalytic oxidation. While the air stripping is a simple and reliable operation for the removal of VOCs from water, the oxidation of VOCs in the humid air stream into harmless compounds ($CO_2$ and $H_2O$) on a conventional oxidation catalyst is inefficient because the catalyst must be heated to high temperatures to avoid deactivation by the moisture. In this case, the equipment and energy costs can be prohibitive.

An alternative method is to contact the contaminated wastewater with oxygen or air in a conventional trickle-bed reactor packed with oxidation catalysts (Three-Phase Catalytic Reactors—Gordon and Breads Science Publishers, Ramachandran, P. A. et al., 1983). This allows the oxidation of pollutants to occur in the liquid phase. Unfortunately oxygen is only sparsely dissolved in water. As a result, the rate of oxidation is low because the process is often limited by mass transfer of reactants to the catalyst sites.

Applicant has previously developed a hydrophobic oxidation catalyst containing a noble metal (Pt, Pd, Rh, Ru, or Ir) and combinations thereof, on a hydrophobic support e.g. styrene divinyl benzene co-polymer, fluorinated carbon and silicalite. See U.S. Pat. No. 5,009,872.

SUMMARY OF THE INVENTION

It is therefore an object of the invention to effect the stripping of VOC from wastewater contaminated with VOC, and oxidation of the VOC to harmless $CO_2$ and water, in a single reactor.

It is a further object of the invention to effect the oxidation of a VOC in the gaseous phase to enhance the rate of oxidation.

It is yet another object of the invention in the case of the more volatile organic compounds, to first strip the VOC from wastewater in a stripping column and then oxidize the VOC in the gaseous phase in a separate catalytic reactor.

This and other objects of the invention are achieved according to a first embodiment of the invention by providing a process for removing a volatile organic compound (VOC) from wastewater contaminated with such VOC, the process comprising (a) providing a reactor containing a packed bed, said packed bed including an inert packing material and a noble metal oxidation catalyst deposited on a hydrophobic support;

(b) flowing a liquid feed containing water and VOC, through the reactor;

(c) flowing a gaseous feed containing oxidizing agent through the reactor; and (d) stripping from the water the VOC in vapour form and then catalytically oxidizing the VOC vapour to form $CO_2$ and water.

According to a second embodiment of the invention, particularly for use with more volatile organic compounds, a process for removing a volatile organic compound (VOC) from water contaminated with such VOC is provided comprising, (a) providing a column containing a packed bed of an inert packing material;

(b) flowing a liquid feed containing water and VOC, through the column;

(c) flowing a gaseous feed containing oxidizing agent through the column;

(d) stripping from the water the VOC in gaseous form; and (e) feeding the VOC containing gas to a catalytic reactor including a noble metal oxidation catalyst deposited on a hydrophobic support, to catalytically oxidize the VOC to form $CO_2$ and water; and optionally (f) recycling the gas from the reactor to the stripping column.

Referring again to the first embodiment of the invention, the packed bed typically includes 10–100%/wt of catalyst and preferably 25–50% of catalyst.

The catalyst is preferably a platinum group metal, and most preferably platinum on a hydrophobic support having a contact angle of ($>50°$) with water.

The reaction temperature is typically in the range of 20° to 180° C., depending upon the VOC to be oxidized. For alcohols and 1,3-butadiene the temperature is in the range of 20° to 80° C.; 80° to 150° C. for BTX (benzene-toluene-xylene mixtures) and phenols; and 120° to 180° C. for chloro-compounds. It will thus be appreciated that near ambient conditions may be employed in some cases.

Respecting the flow rates, the gaseous feed flow rate is typically in the range of 0.1 to 5 kg/m².s and preferably 0.6 to 1.8 kg/m².s. The liquid feed flow rate is typically 0.1 to 20 kg/m².s, and preferably 0.6 to 2 kg/m².s.

With further reference to the second embodiment, the stripping is effected, typically by air-stripping, preferably at a temperature of 55° to 80° C. A typical commercial liquid feed flow rate is 0.8 to 20 kg/m².s and gaseous feed flow rate is 0.1 to 10 kg/m².s.

It will be appreciated that in both embodiments, the flow rates may be varied depending upon the packing used.

The oxidation step is preferably effected at a temperature of 130° to 150° C.

BRIEF DESCRIPTION OF THE DRAWINGS

FIG. 11 is a graph illustrating the effect of temperature on flow rate according to the FIG. 10 embodiment.

Referring to FIG. 1, the oxidation agent (oxygen or an oxygen containing gas such as air) is first purified with an air cleaner 10 and then divided into two streams by mass flowmeter control valves 11.

Figure 1:
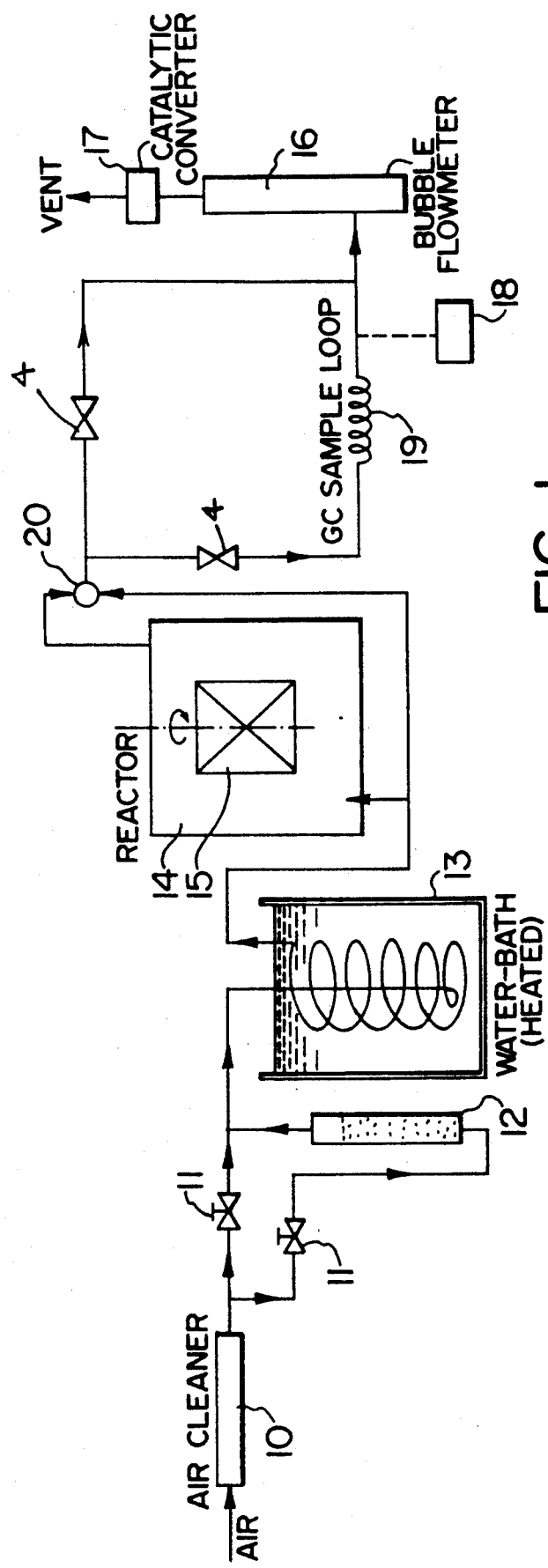
FIG. 1 is a flow-diagram of a typical apparatus used to measure the catalyst activity for the vapour phase reaction according to the invention.

The volatile organic compound (VOC) contaminated water is provided in container 12. One air stream is bubbled through the contaminated water before joining the other stream. In this manner, the composition of the feed stream may be varied. It is also contemplated that other stripping techniques such as steam stripping could also be employed.

The feed stream (contaminated water and air) is then passed through a water bath 13 to heat the reactants to the reaction temperature and fed to the reactor 14.

It will be appreciated that the process may be carried out in several types of reactors. For example, packed or tray-type reactors may be employed.

In the packed type reactor, the packing is a mixture of hydrophobic catalyst and an inert support. For better mass transfer a hydrophilic support is preferred.

The inert hydrophilic support is typically ¼ inch ceramic Raschig rings although other conventional packing materials such as glass spheres, ceramic saddles or ordered bed packings could also be used.

The hydrophobic catalyst is made from the same material by coating the rings with a small quantity of fluorinated carbon and Teflon ® to provide a hydrophobic support and by impregnating with noble metal catalyst e.g. $H_2PtCl_6$ dissolved in ethanol. The catalyst material was rotary evaporated at 95° C. under a slight vacuum to remove the ethanol, then heated in air at 360° C. for 15 minutes. Subsequently, it was reduced in hydrogen at 200° C. until the pH of the furnace outlet became neutral. The platinum loading which was deduced strictly on the basis of the initial weight of the chemical complexes was 0.2% (Wt). Other similar noble metal catalysts/hydrophobic supports are described in applicant's above mentioned U.S. Pat. No. 5,009,872, the disclosure of which is incorporated herein by reference.

With this type of catalyst it is possible to carry out the stripping and oxidation of the VOC in a single reactor. In this reactor the VOCs are first transferred from the liquid to the vapour phase by a conventional gas-liquid desorption process. The contaminants and the oxidant can then reach the catalytic sites by gas phase diffusion which is $10^3$–$10^4$ times faster than the liquid phase diffusion.

Gas compositions were analyzed by a conventional gas chromatograph 18 (HP5730A) equipped with a TCD detector. The pressure and temperature of the gas sample loop 19 are maintained at a fixed value which permits determination of the absolute value of the gas composition after sample calibrations. By changing the position of a 3-way valve 20 both the inlet and outlet gas compositions could be determined. Needle valves 4 are provided to control the gas flow through the GC or by-pass the GC.

The total flow rate is measured by a bubble flowmeter located in the vent.

A catalytic converter 17 may be positioned downstream of the reactor to pick up any remaining traces of VOC in the vent.

EXAMPLE 1

Figure 2:
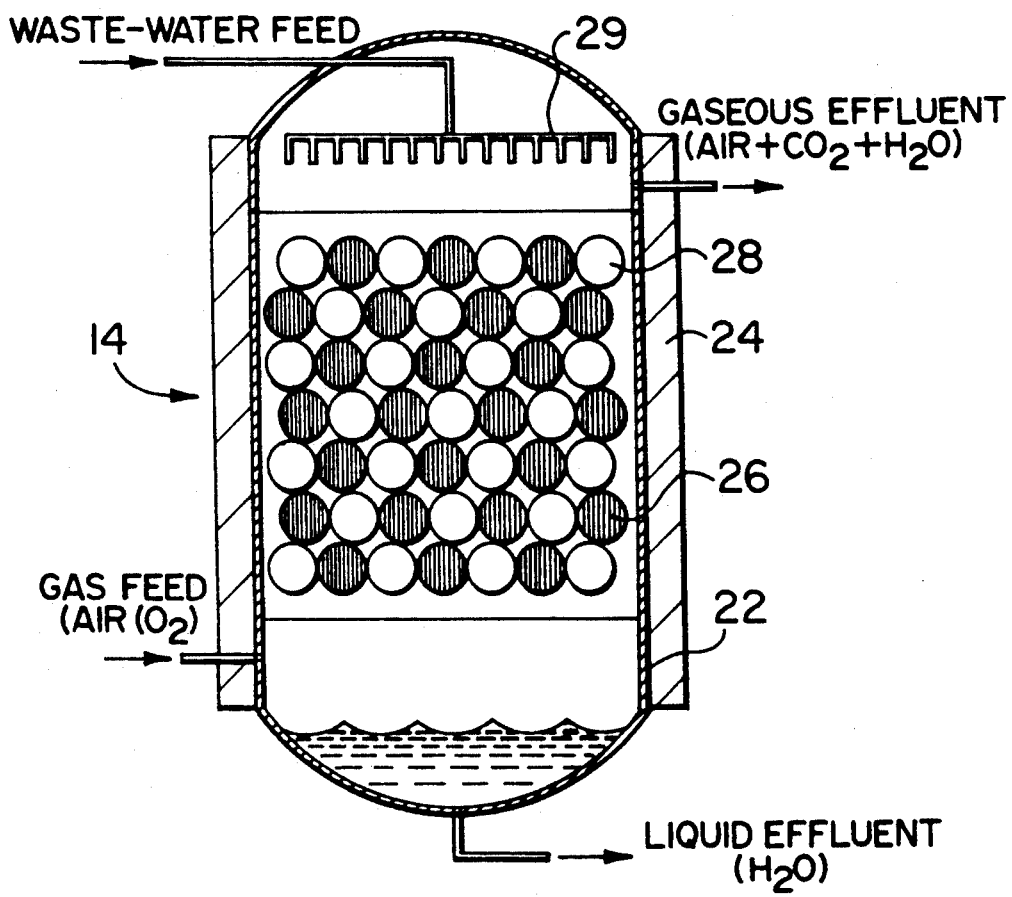
FIG. 2 is a side elevation of a conventional combined stripping/oxidation reactor used in the method according to the invention.

In this example, the VOC is methanol. Due to its low Henry's law constant, a conventional "trickle-bed" reactor is employed. As seen in FIG. 2, the trickle-bed reactor 14 includes a cylindrical central section 22 surrounded by a heating shell or jacket 24. A spray nozzle 29 is provided to ensure good liquid distribution. The cylinder is a glass tube packed with the same hydrophobic catalyst 26 and inert support 28 as described above. The process involves a stripping or desorption of methanol from water, followed by a gas-phase catalytic oxidation of methanol with oxygen into $CO_2$ and $H_2O$. Although the liquid and gaseous feeds are counter currently contacted in the FIG. 2 illustration, it will be appreciated that co-current flows could also be employed.

CATALYST ACTIVITY AND LIFETIME

The trickle-bed reactor operation may be described by a mathematical model. The model includes several steps in the overall process of removing MeOH from wastewater. They are
1) transfer of MeOH from bulk liquid phase to liquid-gas interface,
2) transfer of MeOH from liquid-gas interface to bulk gas phase,
3) transfer of MeOH and oxygen from bulk gas phase to external surface of catalysts,
4) intraparticle diffusion of both reactants to catalytically active sites located inside the porous structure of the catalysts,
5) adsorption of reactants on active sites followed by surface reaction and desorption of products ($CO_2$ and $H_2O$),
6) transfer of products to external surface of catalyst and then to bulk gas phase.

Figure 3:
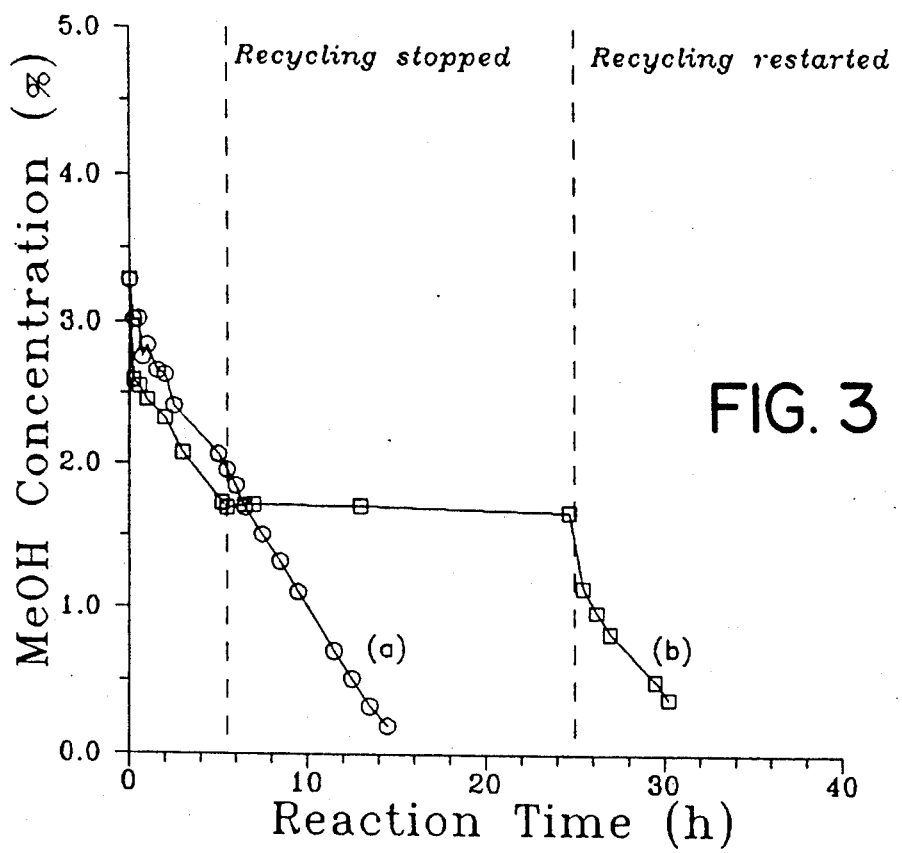
FIGS. 3 to 9 are graphs illustrating the effects of various relevant parameters.

Initially, tests were carried out to determine catalyst activity and lifetime under trickle-bed conditions. The tests were conducted at ambient conditions in a glass tube (2.54 cm ID×20 cm L) packed with catalyst. The column was operated with once-through air and recycled methanol aqueous solution (3%) feeds. The volume of the packed bed was about 45 mL, and the ratio of catalyst to inert support was 1:2. In this semi-batch reactor, the liquid composition could be considered as uniform at a given moment because of the large amount of recirculating liquid. The methanol concentration in liquid phase was measured as a function of reaction time. The results are shown in FIG. 3($a$). It was observed that the methanol concentration dropped to nearly zero after 14 hours of reaction. Several days later, the experiment was repeated using the same catalyst. The evolution of methanol concentration with reaction time is shown in FIG. 3($b$) where the two vertical dash lines indicate the times at which the liquid recirculation was stopped and restarted. From these two tests, it is clear that the hydrophobic catalyst remains active under wet conditions. It was also found that there was no reaction between air and methanol without the presence of a catalyst.

EXPERIMENTAL PROCEDURE IN PERFORMANCE TEST

The trickle-bed reactor made from a glass tube (2.54 cm ID×100 cm L) was packed with the hydrophobic catalyst and inert support. The tests were carried out with bed compositions of 50% and 25% catalyst. The height of the packed section was 66 cm. The total weight of packing was 0.269 kg; the bulk packed bed density $\rho_B$ was 805 kg/m$^3$. The reactor was heated by recirculating hot water in the jacket 24. The gas and liquid feeds were heated by a hot water bath to reaction temperature before entering the column. Both the gas and liquid passed the packed bed on the once-through principle. The methanol concentration in the feed was about 3 mol %. The test temperatures were 40° C., 49° C. and 59° C., and the pressure was nearly atmospheric pressure. For all experiments, the liquid feed (water and methanol) flow rate expressed as superficial liquid mass velocity was from 0.6 to 2 kg/m$^2$.s, corresponding to the liquid Reynolds number from 6 to 25; the gas feed (air/O$_2$2) flow rate expressed as superficial liquid mass velocity was from 0.6 to 2 kg/m$^2$.s, the range of corresponding Reynolds was from 250 to 670. Only CO$_2$ and H$_2$O were detected in the effluent gas and liquid, confirming that the reaction produced no partial oxidation products.

RESULTS AND DISCUSSION

Overall Mass Transfer Coefficient $K_Ga$

Figure 4:
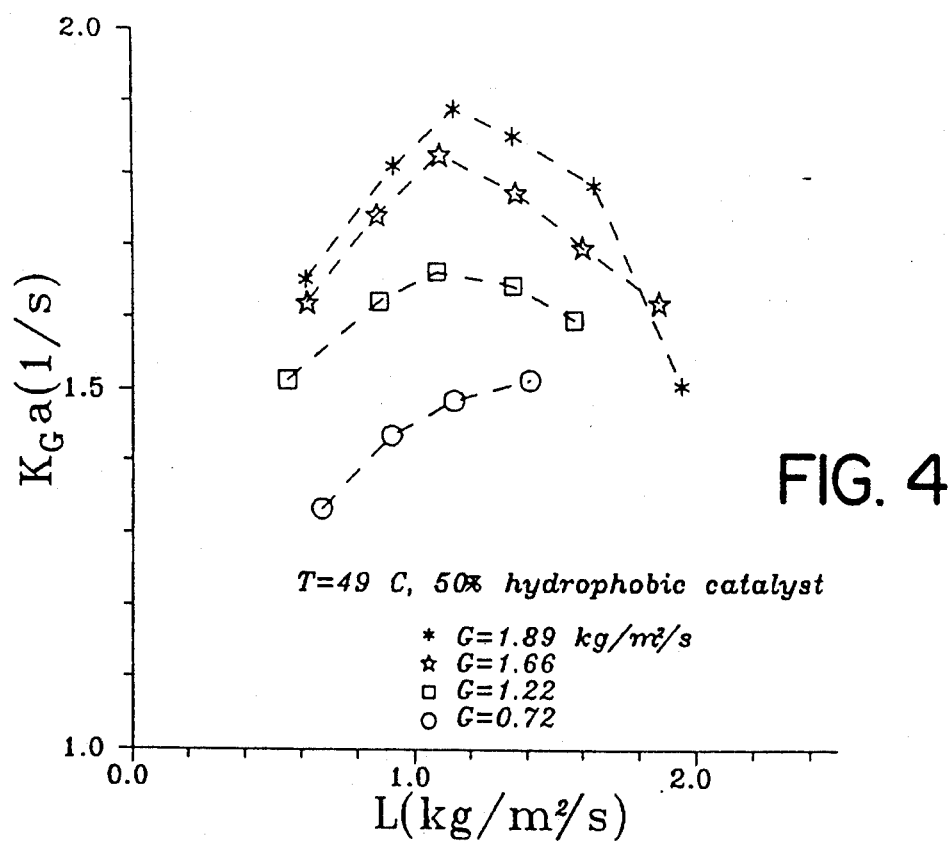

Overall mass transfer coefficients $K_Ga$ are shown in FIG. 4. At constant gas flowrates, the values of $K_Ga$, except for the lowest gas flowrate (G), increase with liquid flowrate (L) to some extent and then decrease with L. Consequently, maximum values of $K_Ga$ were found at a L equal approximately to 1.1 kg/m$^2$.s The phenomena may be explained by the fact that, at higher liquid flowrates, channelling of the liquid stream tends to occur. The fact that the complex variation of $K_Ga$ with liquid flowrate was observed at high gas velocity (G=1.2-2 kg/m$^2$.s) would suggest that at low gas velocities the effective interfacial area increases with liquid flowrate because a low gas velocity has little influence on liquid distribution, whereas at sufficiently high gas velocity its influence on liquid flow is not negligible so the dependence of effective interfacial area on liquid flowrate becomes complex. In other words, at high gas and liquid flowrates, formation of stream channels often occurs resulting in poor interfacial area and the reduction of the overall mass transfer coefficient $K_Ga$, which is a combination of transfer coefficient and interfacial area. The existence of a maximum value of $K_Ga$ indicates the existence of an optimal operating condition.

Figure 5:
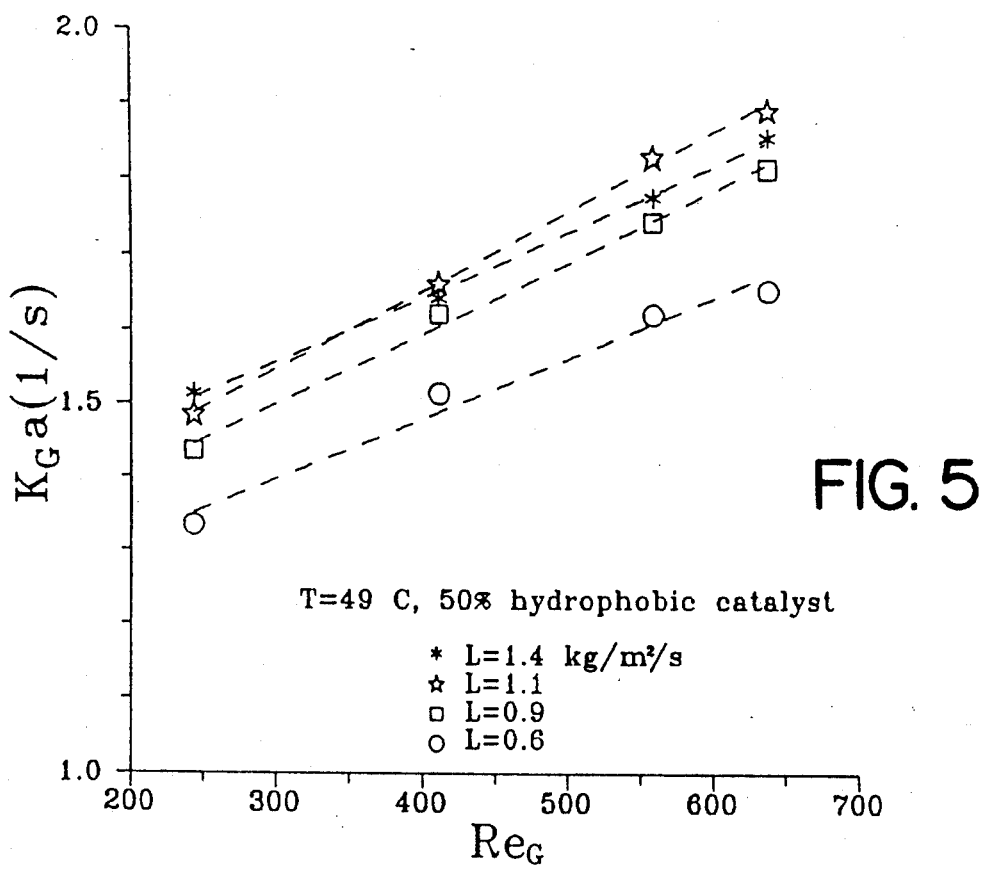
Figure 6:
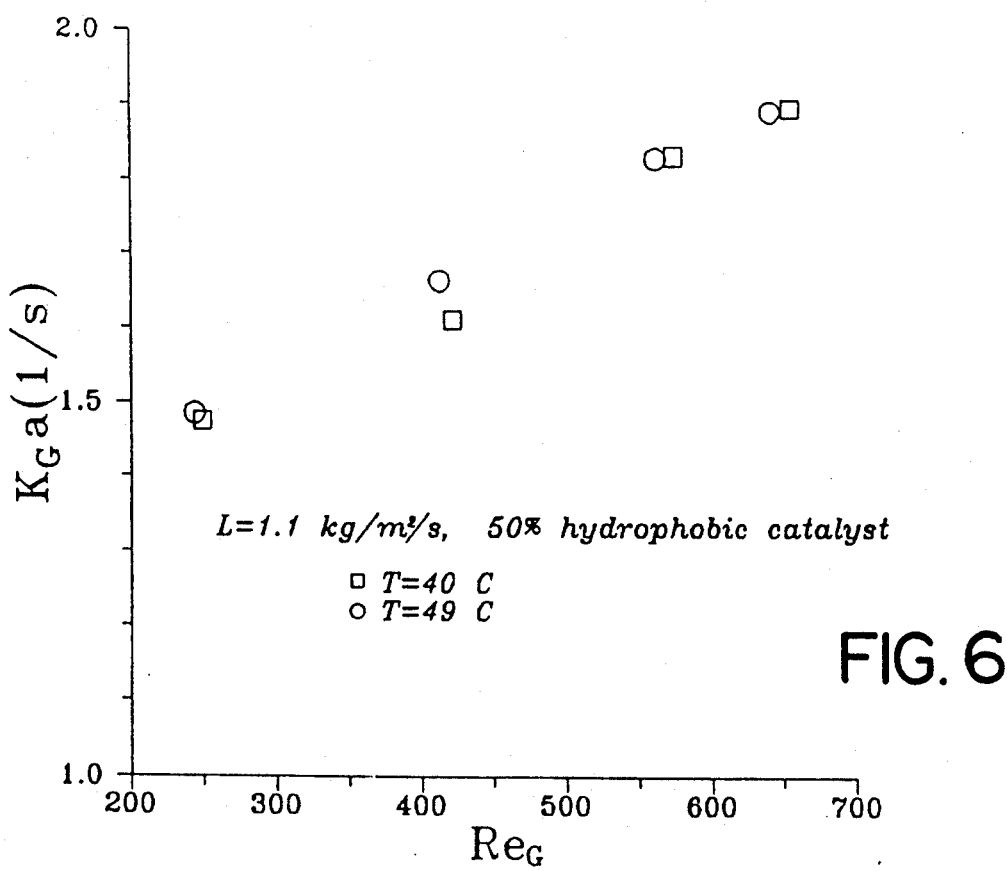

$K_Ga$ values plotted versus gas Reynolds number are given in FIG. 5. A weak dependence of $K_Ga$ values on liquid flowrate is observed when L=0.9 kg/m$^2$.s This observation agrees with the fact that the contribution of liquid side resistance to total mass transfer resistance is negligible since MeOH is very soluble in water. The influence of temperature on mass transfer measurement is shown in FIG. 6. Clearly, the effect of temperature is small for an operation ranging from 40° C. to 59° C.

Figure 7:
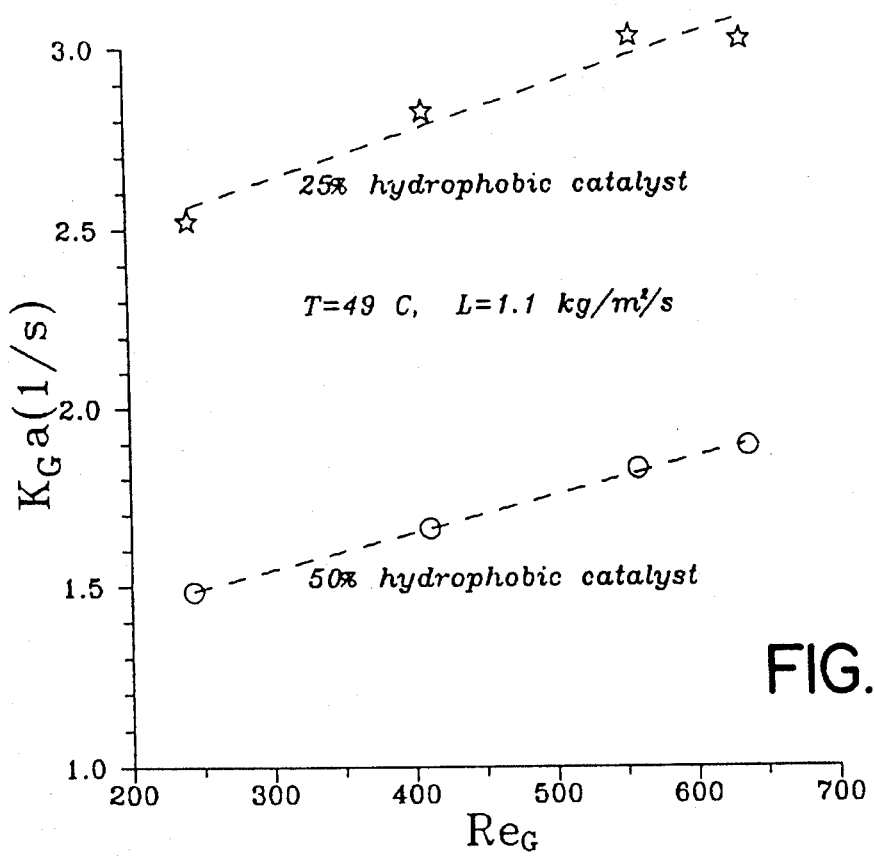

$K_Ga$ values are very strong functions of bed composition, as shown in FIG. 7. When the bed composition changed from 50%/w hydrophobic catalyst to 25%/w, the $K_Ga$ values are increased by more than 50%. This improvement in mass transfer rate may be attributed to the increase in effective interfacial area with high proportion of hydrophilic packings in the column. In our system, desorption/stripping and oxidation occur in series. If the catalyst is very active then the whole process is controlled by the desorption of MeOH from water. Since hydrophilic packing is more efficient for desorption, a decrease in catalyst proportion, in this case, can be beneficial. The $K_Ga$ value should continue to increase with decreasing catalyst proportion until a composition at which the rate of desorption equals the rate of reaction.

COLUMN PERFORMANCE

To evaluate column performance, the pollutant removal efficiency is defined by the following equation:

$$E_{mr} = 100(C_{Li} - C_{Lo})/C_{Li} (\%)$$

where $C_{Li}$ and $C_{Lo}$ are MeOH concentrations in the feed liquid and effluent, respectively.

Figure 8:
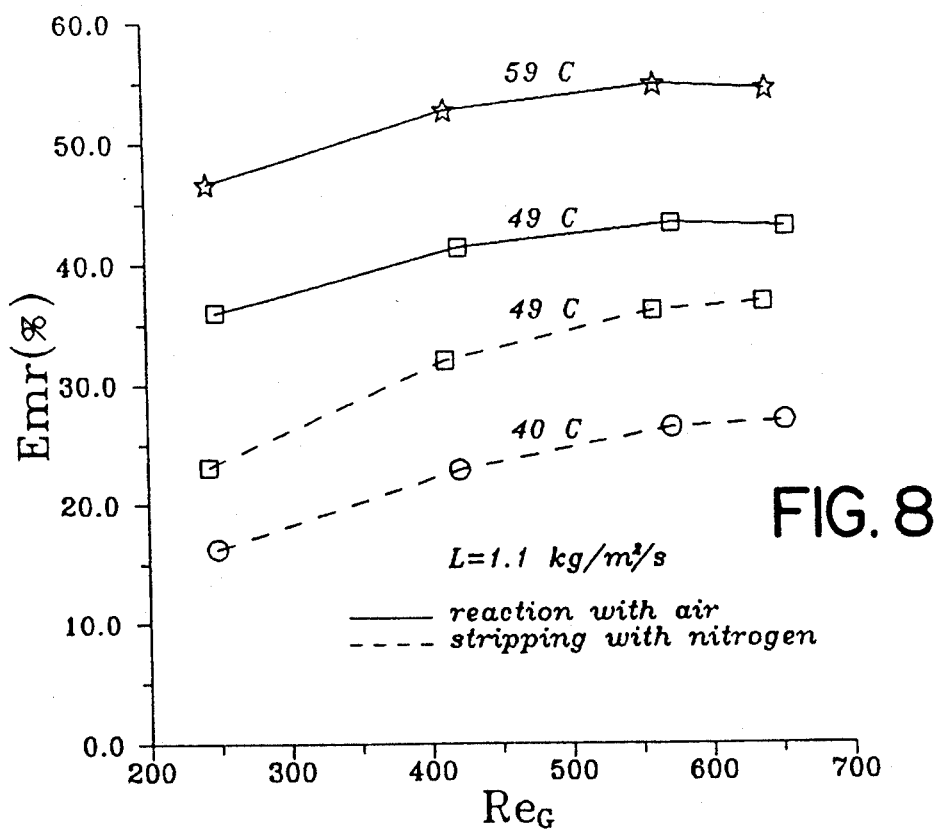

FIG. 8 gives the influence of temperature on Emr. It can be seen that increasing operating temperature favors the removal efficiency since this accelerates the reaction rate and enhances the driving force for mass transfer as well.

Figure 9:
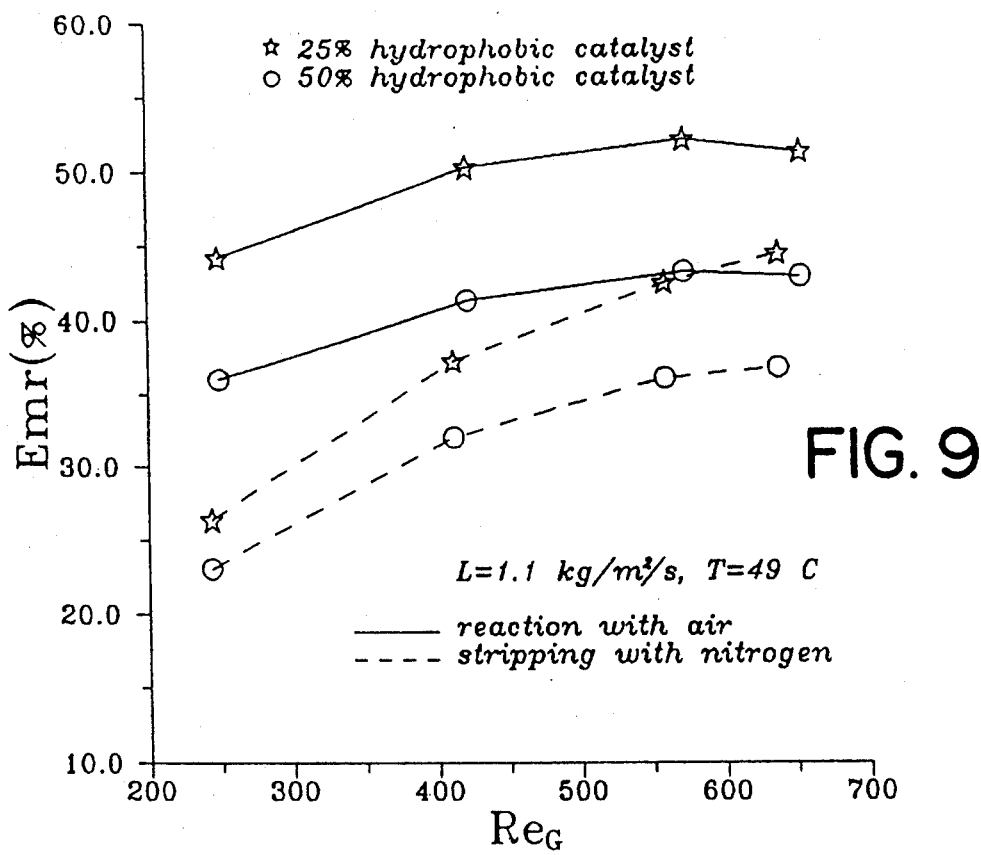

Packing composition has an important effect on removal efficiency, as shown in FIG. 9. This effect agrees with the measurement of the overall mass transfer coefficient (shown in FIG. 7). The data indicate that the controlling step in the methanol removal and destruction process is interfacial mass transfer. As a result, the rate of MeOH removal is enhanced by reducing the fraction of hydrophobic catalyst in the packed bed. Based on the model, there exists an optimal column composition for a particular process to operate at maximum efficiency i.e. about 25%/w catalyst.

Methanol is not very volatile. Accordingly, the trickle bed reactor was used to minimize the equipment size and energy requirement, i.e. lower air flow requirement. A similar situation applies to butanol and phenol. Our results show that phenol requires 120°-150° C. for complete oxidation to CO$_2$ and H$_2$O. Thus, the trickle bed reactor for phenol removal is operated at this temperature range and at a pressure of ~200 psig to avoid boiling of wastewater.

It will be appreciated from Table 1 that for more volatile VOCs e.g. those with a Henry's law constant greater than 10$^{-3}$ such as 1,3-butadiene, BTX mixtures and naphthalene, stripping is easier and the benefit of a single stripping/oxidation reactor is less significant. Accordingly, use of separate stripping and oxidation reactors is preferred for such compounds.

Table 1 below includes relevant data on various VOCs.

TABLE 1

| Organic Compound | Volatility Category | Henry's Law (25° C.) (atm-m3/gmole) |
|---|---|---|
| Butadiene | High | $1.42 \times 10^{-1}$ |
| Toluene (BTX) | Medium | $6.68 \times 10^{-3}$ |
| Naphthalene | Medium | $1.18 \times 10^{-3}$ |
| Butanol | Low | $8.90 \times 10^{-6}$ |
| Methanol | Low | $3.24 \times 10^{-6}$ |
| Phenol | Low | $4.54 \times 10^{-7}$ |

It will be noted that the higher the value of the Henry's Law Constant, the higher the volatility. Also, the lower the volatility, the higher the difficulty in air-stripping.

EXAMPLE 2

Figure 10:
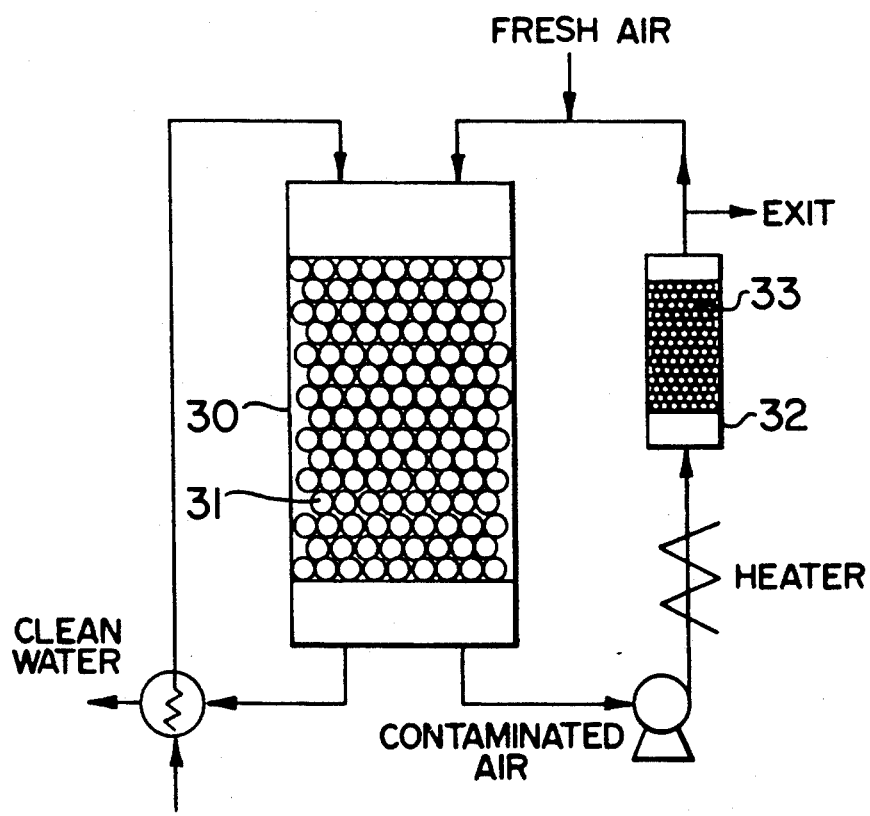
FIG. 10 is a flow diagram of a typical apparatus used to carry out one embodiment of the method according to the invention which employs separate stripping and oxidation reactors with a recycling gas stream.

In this example, as illustrated in FIG. 10, an air-stripping column 30 packed with an inert support 31 and a separate catalytic reactor 32 packed with a hydrophobic catalyst 33, are employed. The same hydrophobic catalyst and inert support materials as described above were used.

A BTX mixture is stripped from wastewater in the air-stripping column, operating at a temperature below about 80° C. Specifically, it was found that for a BTX concentration of 50 ppm at a wastewater feed rate of 32.8 g/m$^2$.sec, at a column packing volume of 32.8L$^3$ and column pressure of 1 atmosphere, a 99% stripping efficiency is achieved at an operating temperature of about 55° C. and a gas flow rate of 1.92 g/m$^2$.s. It was also found (see FIG. 11) that if the temperature was lowered to about 22° C., the airflow rate would have to be raised to about 4.32 kg/s. Accordingly, it is preferably to operate the system at temperatures in the 55° to 80° range to reduce flow rates and lower energy requirements and reduce the size requirements of the stripper and catalytic reactor.

Benzene, toluene and xylene (BTX) in the gas stream containing oxygen in excess of stoichiometric ratio were oxidized at a temperature between 130° C. and 150° C. to harmless $CO_2$ and $H_2O$ in the catalytic reactor. No other by-products were detected.

What is claimed is:

1. A process for removing a volatile organic compound (VOC) from water contaminated with such VOC, comprising
   (a) providing a reactor containing a packed bed, said packed bed including an inert packing material and a noble metal oxidation catalyst deposited on a hydrophobic support;
   (b) flowing a liquid feed containing water and VOC, through the reactor,
   (c) flowing a gaseous feed containing oxidizing agent through the reactor; and
   (d) stripping from the water the VOC in vapour form and then catalytically oxidizing the VOC vapour at a temperature of 20° to 180° C. to form $CO_2$ and water.

2. A process according to claim 1, wherein the packed bed includes 10–100%/w of catalyst.

3. A process according to claim 2, wherein the packed bed includes 25–50%/w of catalyst.

4. A process according to claim 3, wherein the catalyst is a platinum group metal.

5. A process according to claim 4, wherein the catalyst is platinum on a hydrophobic support having a contact angle of >50° with water.

6. A process according to claim 5, wherein the liquid feed flow rate is 0.1 to 20 kg/m$^2$.s.

7. A process according to claim 6, wherein the gaseous feed flow rate is 0.1 to 5 kg/m$^2$.s.

8. A process according to claim 7, wherein both the liquid and gaseous feeds are pre-heated to the reaction temperature.

9. A process according to claim 8, wherein the packed bed includes about 25%/w of catalyst.

10. A process according to claim 9, wherein the liquid feed flow rate is 0.6 to 2 kg/m$^2$.s.

11. A process according to claim 10, wherein the gaseous feed flow rate is 0.6 to 1.8 kg/m$^2$.s.

12. A process according to claim 4, wherein the VOC is selected from the group consisting of alcohols, 1,3-butadiene, BTX mixtures, phenols and chloro-compounds.

13. A process according to claim 12, wherein the VOC is selected from the group consisting of methanol, butanol and phenol.

14. A process according to claim 4, wherein the liquid feed flow is counter-current or cocurrent to the gaseous feed flow.

15. A process according to claim 4, wherein the oxidizing agent is selected from air and oxygen.

16. A process according to claim 4, wherein the inert packing material is a hydrophilic material.

17. A process according to claim 4, wherein the reactor is a trickle-bed reactor.

* * * * *